Inventor:
James W. Welsh.
by David Rines
Attorney:—

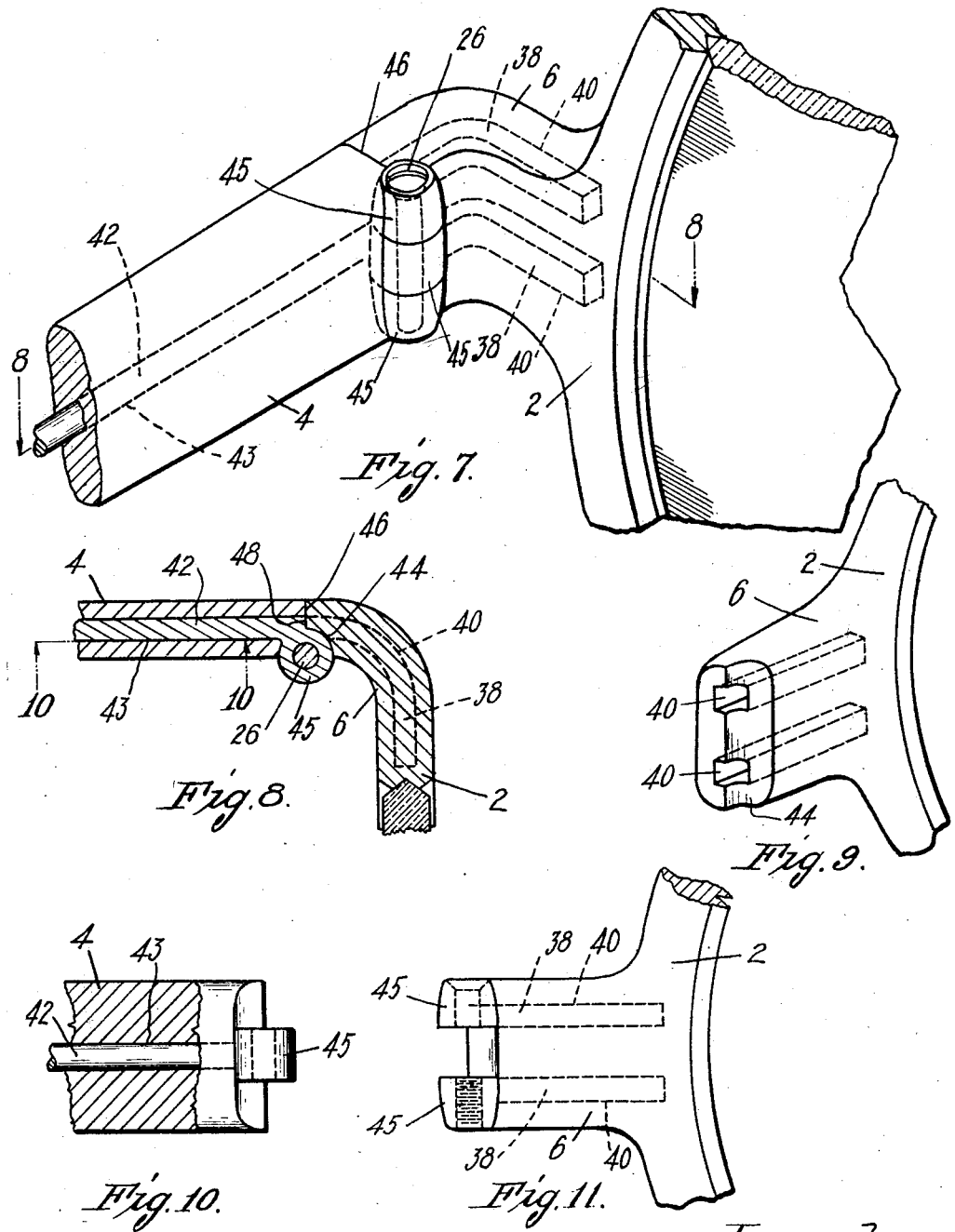

Patented Apr. 9, 1929.

1,708,203

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed February 19, 1923. Serial No. 619,806.

The present invention relates to ophthalmic mountings, particularly mountings of the non-metallic type.

The chief object of the invention is to improve upon present-day hinge connections between the fronts and the temples of ophthalmic mountings of the above-described character. Other objects will appear hereinafter.

Figure 1:
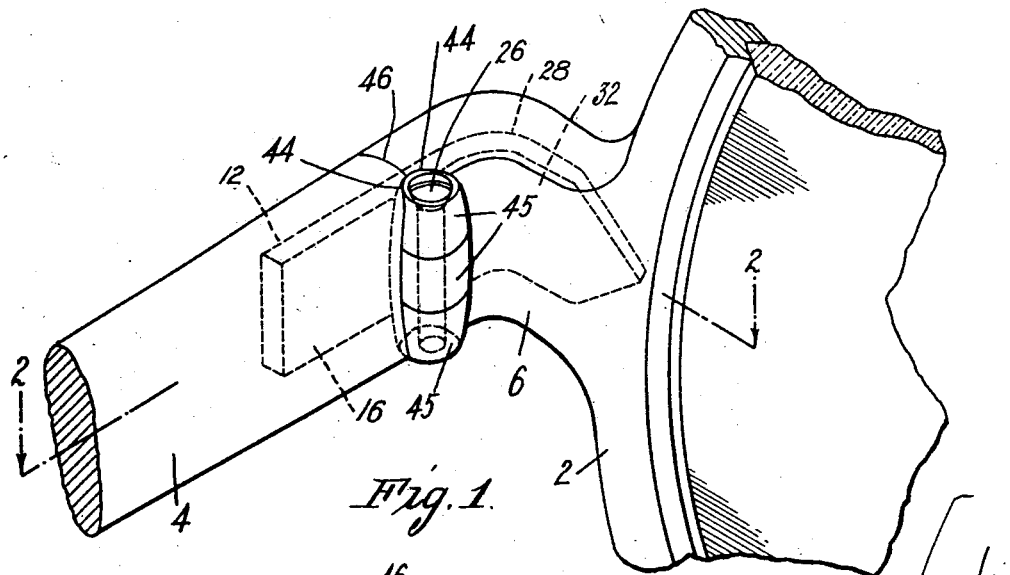
Figure 2:
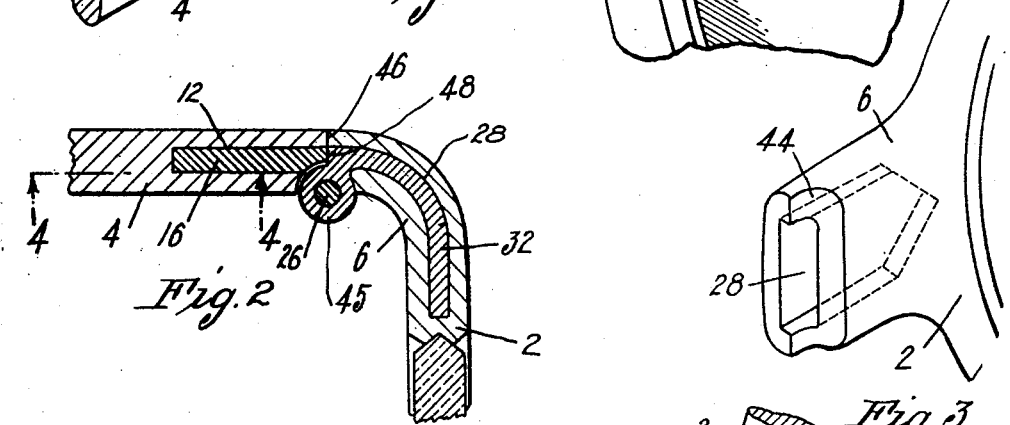
Figure 3:
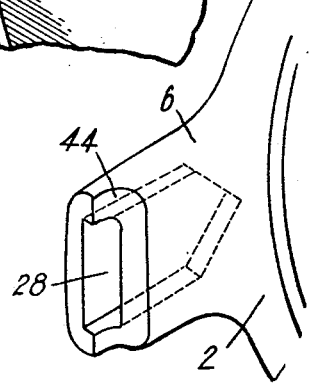
Figure 4:
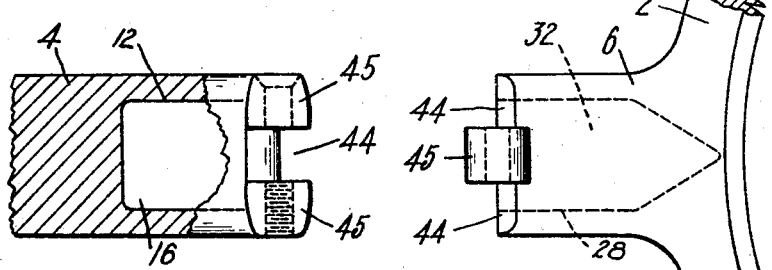
Figure 5:
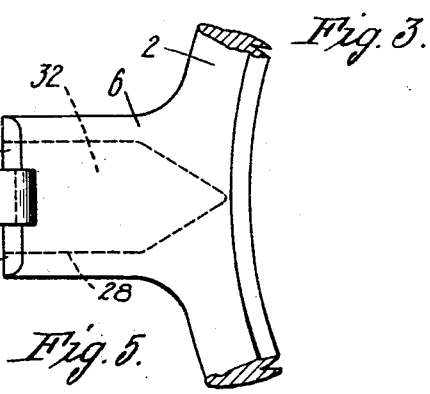
Figure 6:
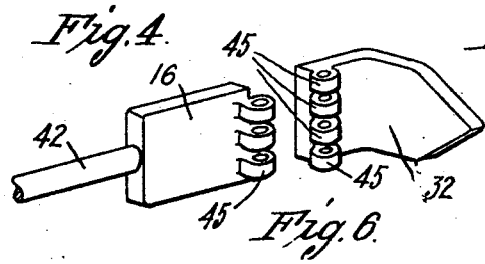

In the accompanying drawings, Fig. 1 is a fragmentary perspective view of an ophthalmic mounting constructed according to a preferred embodiment of the present invention; Fig. 2 is a section taken upon the line 2—2 of Fig. 1, looking in the direction of the arrows; Fig. 3 is a perspective view, illustrating a step in the preferred method of making the preferred mounting of the present invention; Fig. 4 is a fragmentary elevation, partly in section, along the line 4—4 of Fig. 2, looking in the direction of the arrows; Fig. 5 is a fragmentary elevation of a portion of the front shown in Fig. 1, illustrating a step in the manufacture; Fig. 6 is a perspective view of a modified hinge, the hinge elements being shown detached; Fig. 7 is a view similar to Fig. 1 of a modification; Fig. 8 is a section taken upon the line 8—8 of Fig. 7, looking in the direction of the arrows; Fig. 9 is a view similar to Fig. 3, but corresponding to the modification shown in Fig. 7; Fig. 10 is a section similar to Fig. 4, the section being taken as upon the line 10—10 of Fig. 8, looking in the direction of the arrows; and Fig. 11 is a view corresponding to Fig. 5 of the modification shown in Fig. 7.

Non-metallic mountings of the character illustrated in the present invention are usually constituted of a non-metallic front 2 and non-metallic temples 4. The temples are hinged at their forward ends to end pieces 6 of the front 2. The preferred temple is provided with a comparatively wide, open-ended groove 12 in which is seated a hinge plate 16.

The end piece 6 of the front 2, originally straight, as shown in Fig. 3, is provided with an open-ended groove 28 extending throughout a comparatively wide portion of the end piece 6, corresponding to the wide groove 12. A correspondingly wide hinge plate 32 is seated in the groove 28. After this last-named hinge plate has been mounted in the groove 28 of the straight end piece 6, as shown in Fig. 5, the end piece 6, with the hinge element embedded therein, is bent or curved into the form shown in Fig. 1. The wide hinge plate affords a better anchoring effect of the metal in the non-metallic material.

It is not essential, however, that the groove 28 in the end piece 6 or the hinge plate 32 be as wide as shown. A plurality of hinge elements 38 seated in a plurality of correspondingly positioned, smaller grooves 40, as illustrated in Figs. 7 to 11, will be equally effective. The method of construction is the same as above described. In these figures, too, a modification is shown in the hinge element 42 of the temple, in that it is elongated to constitute a reinforcing rod extending throughout the length of the temple in a longitudinal groove 43. The reinforcing rod may also be provided upon the hinge element 16 shown in Fig. 1, as indicated in Fig. 6.

In both modifications, the end pieces of the fronts and the forward ends of the temples are circularly cut away at 44, at the openings to the hinge-element-receiving grooves, to receive cylindrical- or barrel-shaped portions 45 that are integrally provided at the ends of the hinge elements. The cylindrical- or barrel-shaped portion may be gold filled or precious metal, while the remainder of the hinge elements, being hidden within the end pieces 6 and the temples 4, may be of base metal. The cylindrical- or barrel-shaped portions 45 may be few, as shown in Figs. 1 to 5 and 7 to 11, or comparatively many, as illustrated in Fig. 6. A pintle 26 pivotally connects the hinge elements together. This construction permits the ends of the temple and of the curved end piece to come together smoothly, as shown at 46 in Figs. 1, 2, 7 and 8. The end portions of the hinge elements 16 and 32 are flushed with the portions shown at 46, so as to come together at the same time, as indicated at 48, to constitute a metal stop for the pivotal movement of the temple about the pivot 26 of the hinge. The cylindrical- or barrel-shaped portions 45 of the hinge element that is secured in the temple shown in Fig. 4, for example, are adapted to pivot in the circularly cut-away portions 44 of the front shown in Fig. 5; and the portion 45 of the hinge element that is secured in the front shown in Fig. 5 is adapted to pivot in the circular portion 44 of the temple shown in Fig. 4.

A mounting constructed in accordance with the present invention is most efficient, the parts being nicely adjusted, and it is of pleasing appearance, no metal parts being visible when the mounting is viewed from the front.

What is claimed is:

1. An ophthalmic mounting comprising a front constituted of non-metallic material having an integral end piece provided with an open-ended groove extending substantially throughout the width of the end piece, and a temple constituted of non-metallic material having a correspondingly wide groove, the end piece and the temple being circularly cut away at the openings to the grooves, a hinge element seated in each groove constituted of a plate of corresponding width and of the shape of the groove and having a cylindrical- or barrel-shaped portion in the circularly cut-away portion, and a pintle in the cylindrical- or barrel-shaped portion for connecting the hinge elements together.

2. A temple having a groove extending longitudinally of the temple, the temple being circularly cut away at the opening to the groove, and a hinge element mounted in the groove and having a cylindrical- or barrel-shaped portion in the circularly cut-away portion, the hinge element having integral therewith a reinforcing rod that extends substantially throughout the length of the temple.

3. An ophthalmic mounting comprising a non-metallic front having an integral curved end piece provided with a curved, open-ended groove extending substantially throughout the width of the end piece, and a hinge element seated in the groove constituted of a flat plate of corresponding width curved to the shape of the groove and having a barrel-shaped portion extending beyond the end piece.

4. An ophthalmic mounting comprising a non-metallic front having a front face, a rear face and an end face and an open-ended groove extending into the end face between the front face and the rear face, a non-metallic temple having a front face, a rear face and an end face and an open-ended groove extending into the end face between the front face and the rear face, and a hinge having two pivoted elements one of which is seated in each groove with the end portions of the hinge elements flush with the end faces of the front and the temple, respectively, the hinge elements being pivoted together so that the said end portions of the hinge elements shall constitute a stop for the pivotal movement of the temple about the pivot of the hinge.

5. An ophthalmic mounting comprising a non-metallic front having an end piece provided with a front face, a rear face and an end face and an open-ended groove extending into the end face between the front face and the rear face, a non-metallic temple having a front face, a rear face and an end face and an open-ended groove extending into the end face between the front face and the rear face, the end piece and the temple being circularly cut away at the openings to the grooves, and a hinge having two pivoted elements one of which is seated in each groove with the end portions of the hinge elements flush with the end faces of the end piece and the temple, respectively, the hinge elements being pivoted together so that the said end portions of the hinge elements shall constitute a stop for the pivotal movement of the temple about the pivot of the hinge, the hinge elements having cylindrical- or barrel-shaped portions in the cut-away portions.

In testimony whereof, I have hereunto subscribed my name this 26th day of January, 1923.

JAMES W. WELSH.